United States Patent [19]

Lenta et al.

[11] Patent Number: 5,289,477
[45] Date of Patent: Feb. 22, 1994

[54] PERSONAL COMPUTER WHEREIN ECC AND PARTLY ERROR CHECKING CAN BE SELECTIVELY CHOSEN FOR MEMORY ELEMENTS INSTALLED IN THE SYSTEM, MEMORY ELEMENTS ENABLING SELECTIVE CHOICE OF ERROR CHECKING, AND METHOD

[75] Inventors: Jorge E. Lenta, Boca Raton; Mitchell E. Medford, Delrary Beach, both of Fla.

[73] Assignee: International Business Machines Corp., Armonk, N.Y.

[21] Appl. No.: 711,480

[22] Filed: Jun. 6, 1991

[51] Int. Cl.⁵ .................. G06F 11/00; G06F 11/08
[52] U.S. Cl. ........................... 371/37.7; 371/40.4; 395/425; 364/DIG. 1
[58] Field of Search ... 364/200 MS File, 900 MS File; 395/400, 425; 371/37.7, 40.4, 41

[56] References Cited

U.S. PATENT DOCUMENTS

| | | | |
|---|---|---|---|
| 4,646,304 | 2/1987 | Fossati et al. | 371/40.4 |
| 4,730,320 | 3/1988 | Hidaka et al. | 371/40.4 |
| 4,873,687 | 10/1989 | Breu | 371/8.2 |
| 4,888,773 | 12/1989 | Arlington et al. | 371/40.2 |
| 4,955,024 | 9/1990 | Pfeiffer et al. | 371/40.1 |
| 4,980,850 | 12/1990 | Morgan | 395/425 |
| 5,056,095 | 10/1991 | Horiguchi et al. | 371/40.1 |
| 5,172,379 | 12/1992 | Burrer et al. | 371/37.1 |

*Primary Examiner*—Joseph L. Dixon
*Assistant Examiner*—Frank J. Asta
*Attorney, Agent, or Firm*—Daniel E. McConnell

[57] ABSTRACT

This invention relates to a personal computer having enhanced memory access capabilities, a memory element enabling such enhancement, and a method of operation of a personal computer. The invention contemplates that enhanced capabilities will be attained by enabling a choice between error detection technologies used.

8 Claims, 8 Drawing Sheets

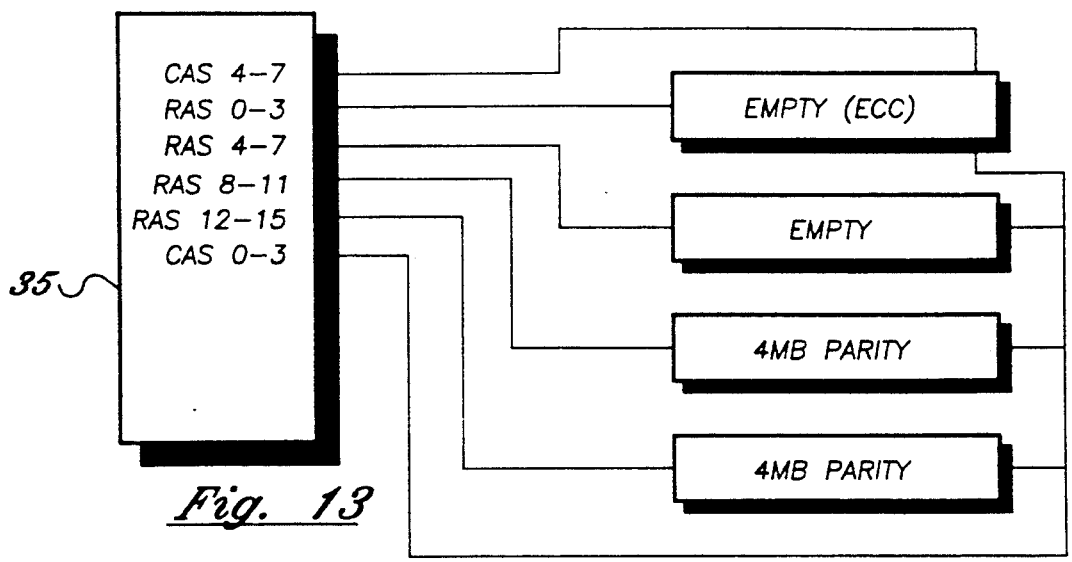
_Fig. 13_
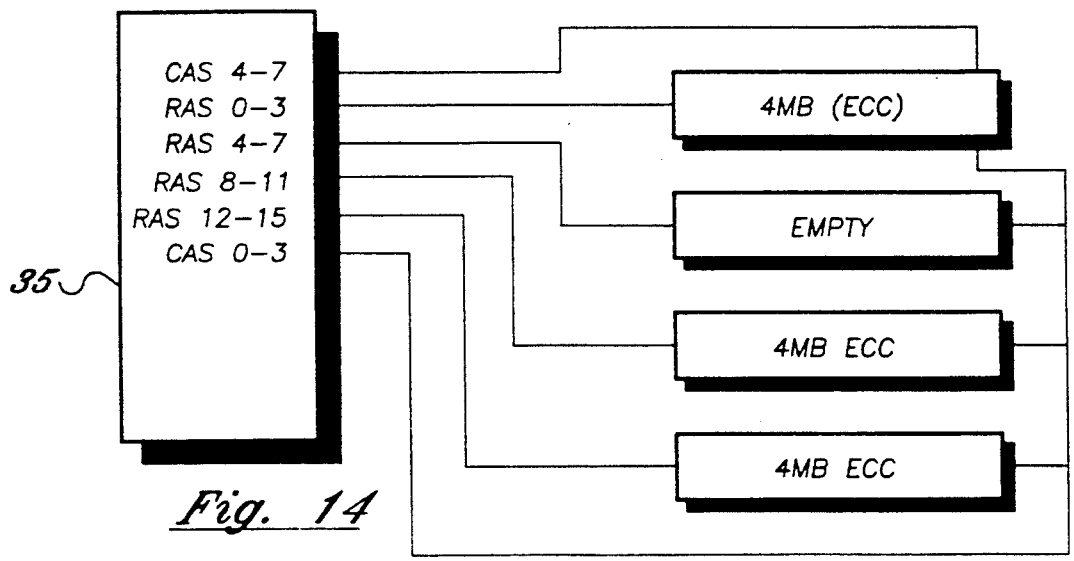
_Fig. 14_
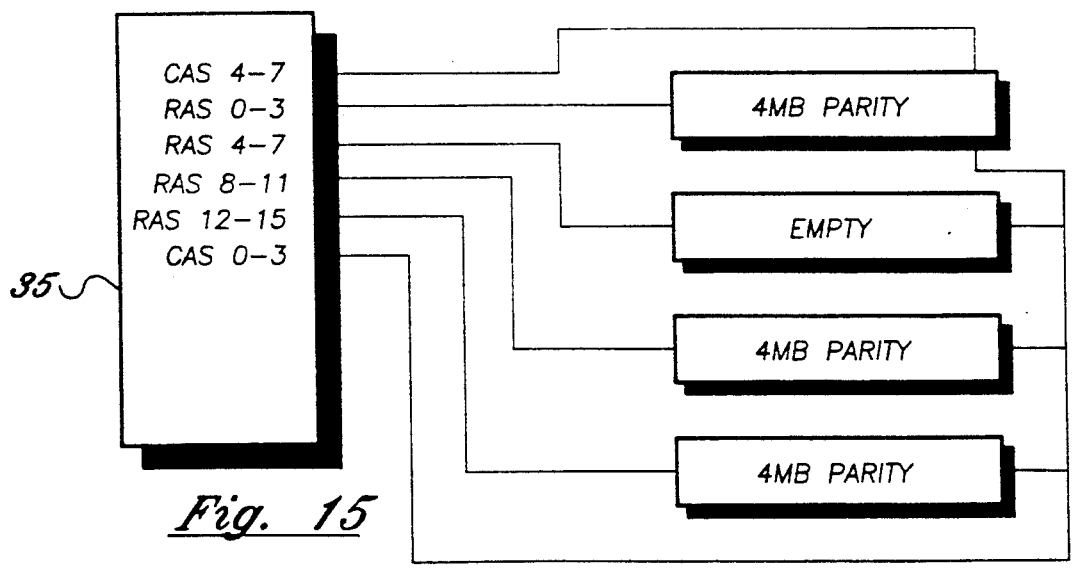
_Fig. 15_

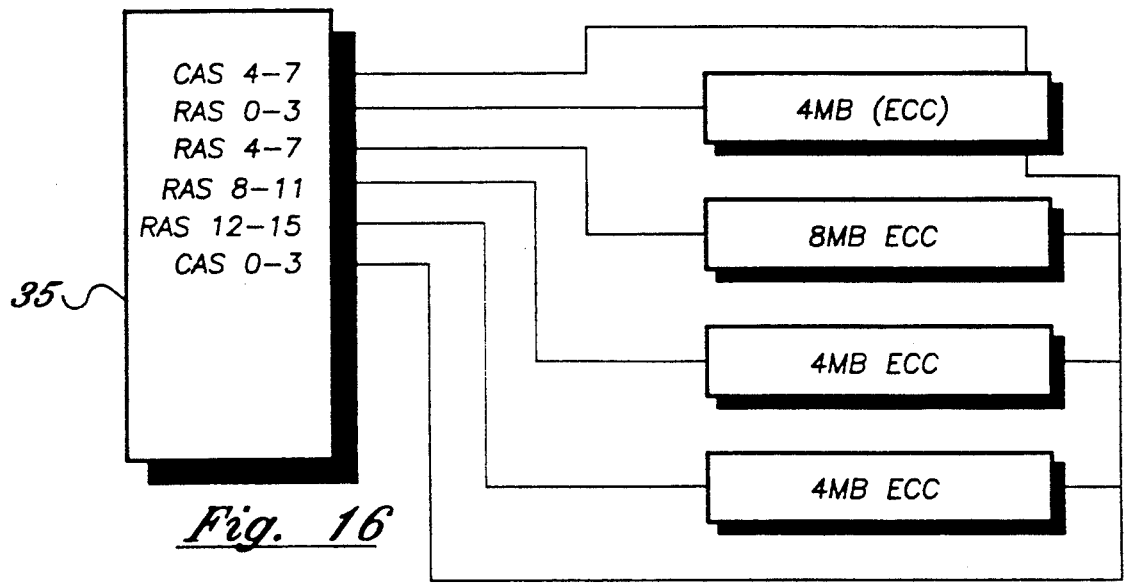
_Fig. 16_
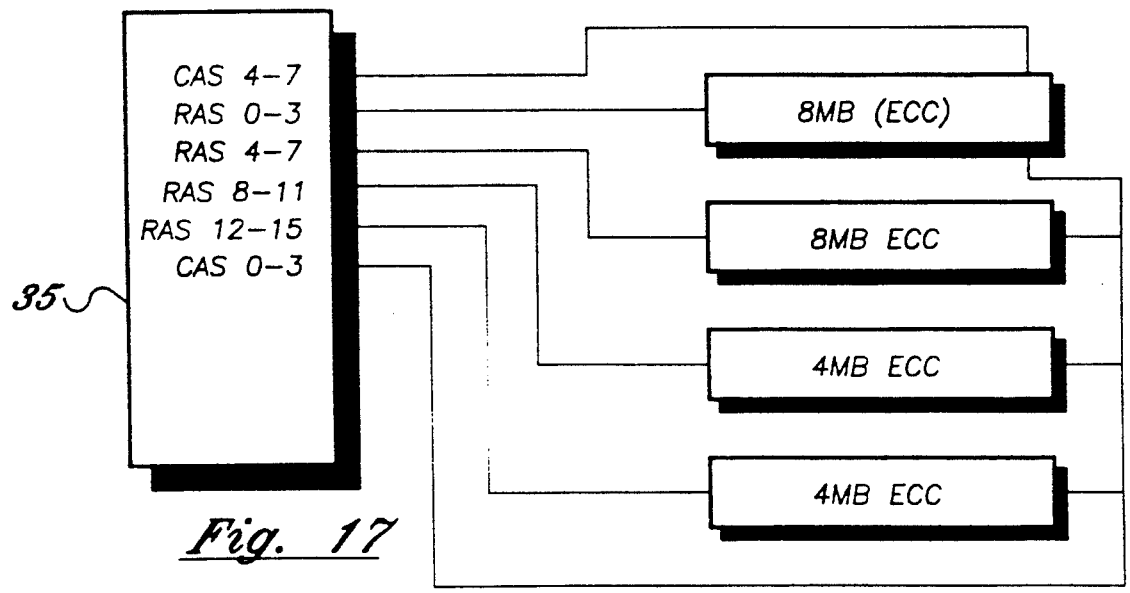
_Fig. 17_

PERSONAL COMPUTER WHEREIN ECC AND PARTLY ERROR CHECKING CAN BE SELECTIVELY CHOSEN FOR MEMORY ELEMENTS INSTALLED IN THE SYSTEM, MEMORY ELEMENTS ENABLING SELECTIVE CHOICE OF ERROR CHECKING, AND METHOD

TECHNICAL FIELD

This invention relates to a personal computer having enhanced memory access capabilities, a memory element enabling such enhancement, and a method of operation of a personal computer. The invention contemplates that enhanced capabilities will be attained by enabling a choice between error detection technologies used.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Data being processed in high performance personal computers such as some of those mentioned above is conventionally written to, stored in and read from dynamic random access memory (DRAM) using conventional data storage technology. While such technology has been quite successful, persons skilled in the arts of computer design and use have known for some time that all DRAM has inherent soft errors. That is, data written to, stored in or read from DRAM will contain errors over time. The degree to which such error interfere with personal computer operation will vary with the particular application for which the computer is being used. An error rate acceptable for a personal computer used only for word processing may be found completely unacceptable for a personal computer used as a file server supporting financial record keeping and analysis applications necessary to the operation of an ongoing business venture.

Recognizing the inherency of DRAM data or soft errors, most personal computer design have adopted some known technology for guarding against adverse effects of such errors. The most common such technology is known as parity checking or parity. With parity checking, each predetermined number of bits of data used for transferring or storing information is accompanied by a parity bit used to validate the accuracy of the data bits. One typical arrangement uses one parity bit for eight data bits. Typically, such a parity design will detect an error of a single bit in a byte (eight bits). An alternate technology is known as error correcting code or ECC. ECC (depending upon its implementation) can detect errors of one or more bits in a word and can correct errors of one bit in a word. ECC typically adds to the data bits defining a word from four to seven bits used in the error detection and correction routines. ECC is, as a general matter, known and the present invention relies upon such known technology.

Prior to the present invention, personal computer designers and users essentially have been faced with the parity or ECC choice at a very early level in determining personal computer system capabilities. In particular, a user concerned with achieving high levels of reliability (in the sense of minimizing the impact of DRAM soft errors) would be compelled to select a machine designed to have ECC capability, even if many applications to be supported by that machine would be satisfactorily served by parity memory.

Further, there has been a trend over recent time toward packaging of memory elements in more readily handled forms. With increasing density of memory elements, in terms of quantities of data words stored, memory elements have moved from single chips to single inline memory modules (SIMM) and toward what has become known as DRAM cards. A DRAM card is a packaging of memory elements mounted on a substrate within a protective sleeve or enclosure and coupled to the remainder of a computer system by an appropriate pin and socket connection. In one form, such a DRAM card may have dimensions of approximately fifty four millimeters wide by eighty five millimeters long by three millimeters thick. It is contemplated that such dimensions may vary and will be reduced as technological advances permit. One advantage of DRAM cards is that such memory elements are readily removed and replaced from computer systems and may be handled by users almost as easily as the well known floppy disks with which all personal computer users are familiar. However, even with such development of the applicable technology, parity and ECC memory elements have remained non-interchangeable. That is, a user of a machine first configured for parity memory elements and wishing to change to ECC memory elements would be required to remove and replace all memory elements to effect the desired conversion.

BRIEF DESCRIPTION OF THE INVENTION

With the foregoing in mind, it is an object of this invention to provide a memory element usable in association with a personal computer for enabling a choice of error detection technologies. In realizing this object of the present invention, a memory element is provided which is capable of being fully accessed by memory control signals, namely row address and column address signals (respectively controlled or known by RAS and CAS).

A further object of this invention is to provide a personal computer in which a user has the possibility of readily selecting between parity and ECC technologies for detecting DRAM errors. In realizing this object of this invention, a user of a personal computer system is permitted to readily adjust the error detection technology used to the particular applications of the system without having to remove and discard memory elements.

Yet a further object of the invention is to provide for operation of a personal computer in such a manner that memory elements may be used in common in a selected one of either parity or ECC error detection technologies. In realizing this object of the present invention, an allocation of the data bits necessary for the error detection technologies is made between two memory elements.

BRIEF DESCRIPTION OF THE DRAWINGS

Some of the objects of the invention having been stated, other objects will appear as the description proceeds, when taken in connection with the accompanying drawings, in which:

FIG. 7 through 17 are schematic illustrations of portions of the personal computer of FIGS. 1 through 3 showing adaptation of the personal computer to varying amounts of DRAM memory and varying error detection technology.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
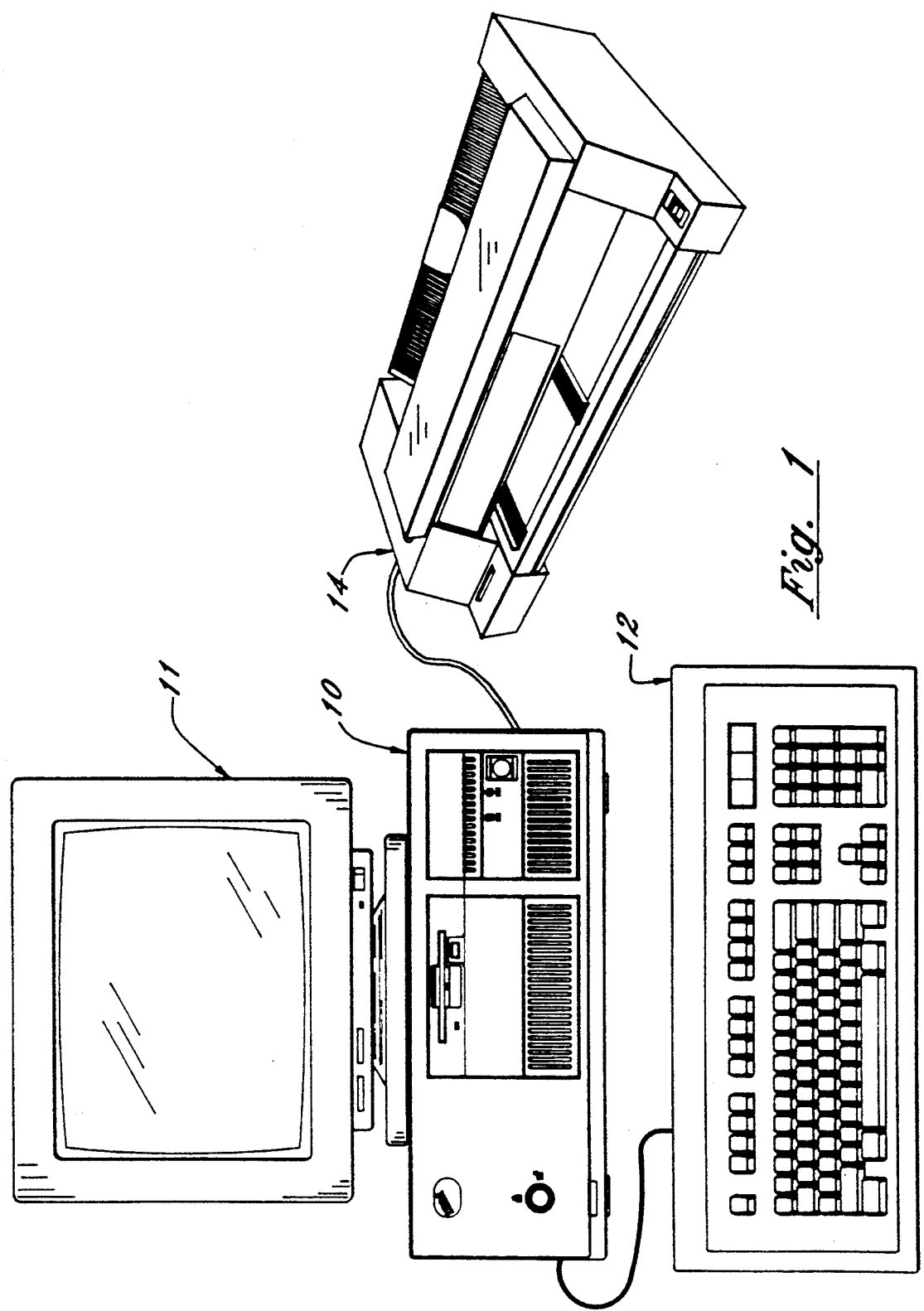
FIG. 1 is a perspective view of a personal computer embodying this invention.
Figure 2:
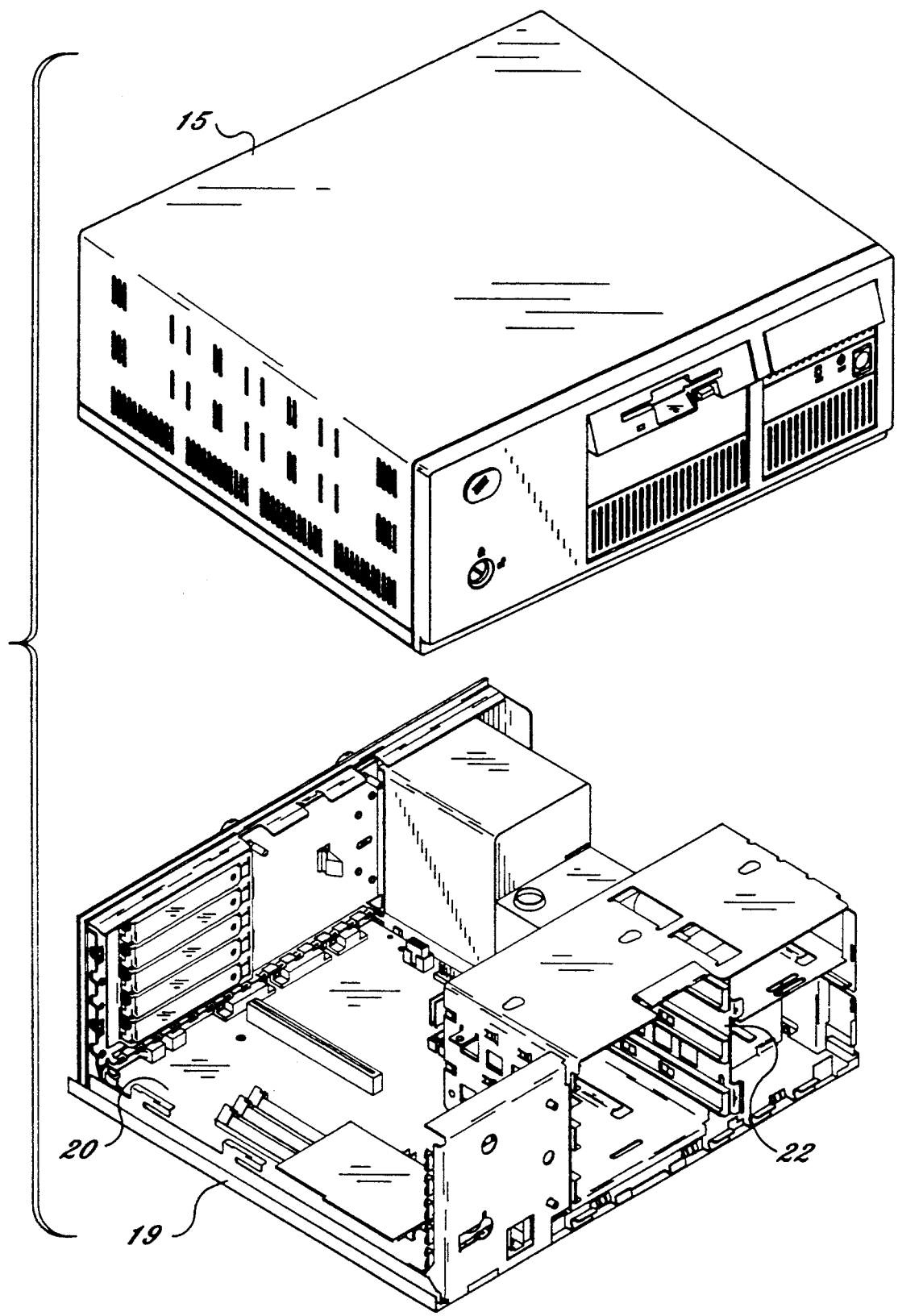
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
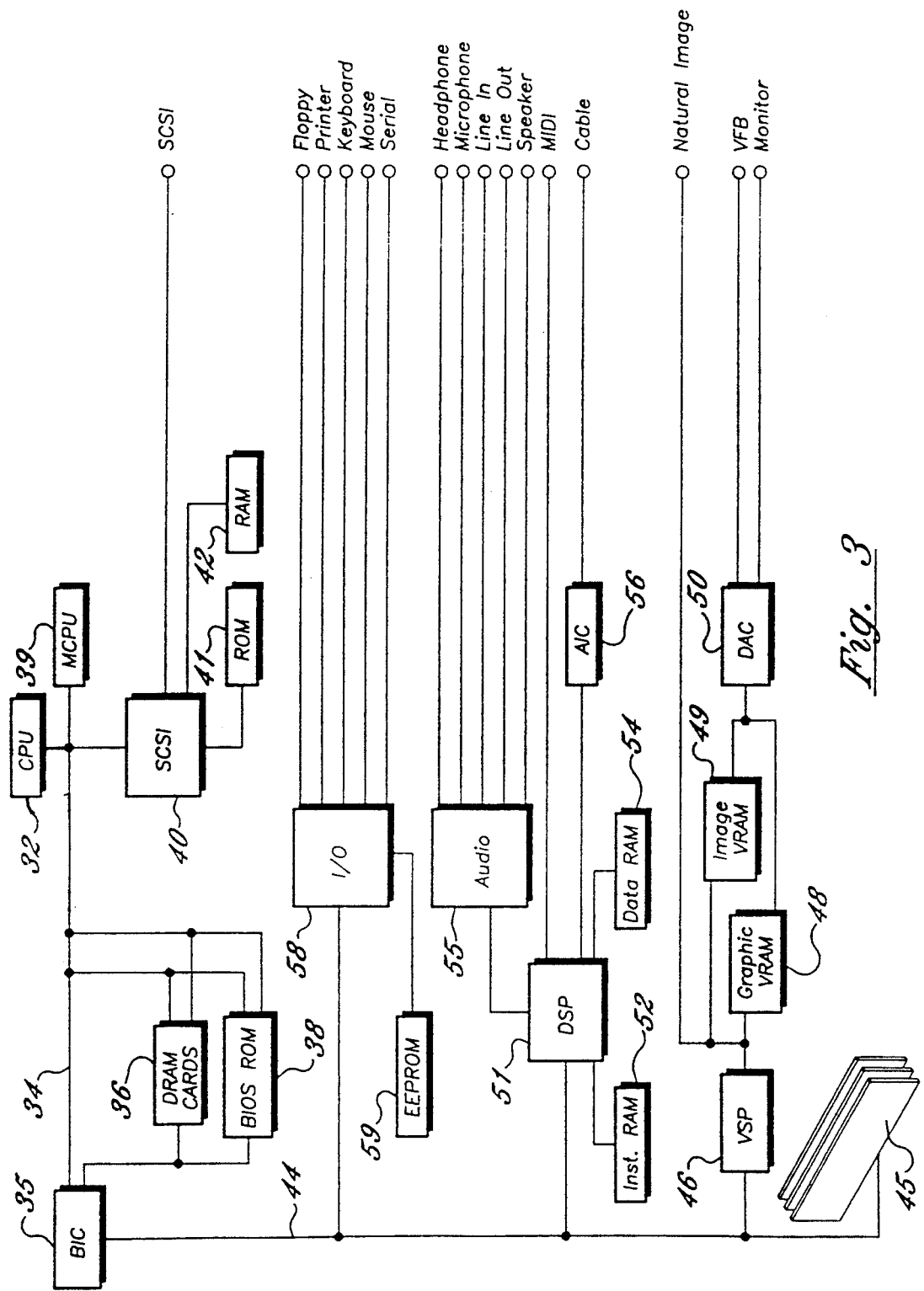
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as DRAM cards, and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS. Preferably, each DRAM card present is received in a corresponding one of a plurality of socket connectors provided for receiving the cards and connecting to the pins provided.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44 and serves a number of other functions, including that of memory controller as pointed out more fully hereinafter. By means of the I/O bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. A number of other functions served by the bus interface controller 35 may be found by the interested reader in the disclosures of co-pending U.S. applications Ser. Nos. 706,490; 706,539 and 706,602 filed May 28, 1991. To any extent necessary to a full understanding of this invention, the disclosures of those co-pending application are hereby incorporated by reference into the present subject description.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Turning now more specifically to the present invention, the following discussion will contemplate that data may be written to memory, stored in memory, and read from memory in data widths of eight, sixteen or thirty two bits. Typically, one parity bit is provided for each eight bits, so that a thirty two bit wide data transfer has four parity bits. The number of ECC bits needed to permit ECC operation varies with the functions desired and with the data width. In particular, ECC may be operated with single bit error correction without double bit error detection (herein "Mode I") or single bit error correction with double bit error detection (herein "Mode II"). For an eight bit data width, four ECC bits enable Mode I operation, while five bits are necessary for Mode II. Five bits enable Mode I operation for sixteen bit wide data transfer, and six enable Mode II. Six bits enable Mode I for thirty two bit wide transfers, and seven enable Mode II.

Figure 4:
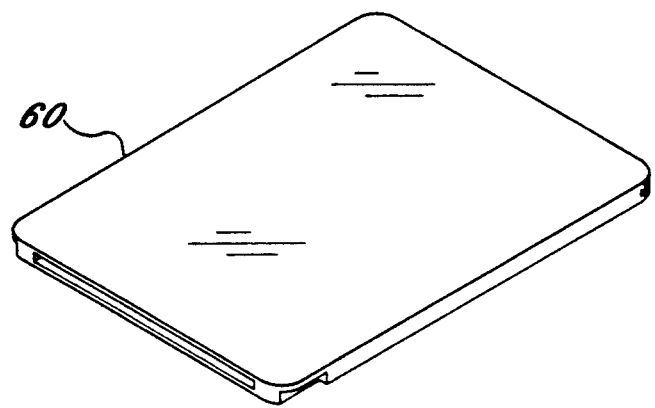
FIG. 4 is a perspective view of a memory element in accordance with the present invention in the form of a DRAM card.

The present invention is embodied in part in a memory element in the form of a DRAM card 60 (FIG. 4). The DRAM card 60 has a substrate mounting memory chips, and enclosing cover facilitating handling of the card, and a plurality of pins providing for connection to the memory chips housed within the enclosure. As generally described to this point, the DRAM card may accord fully with engineering specifications published by cooperating engineering design groups such as the JEDEC Solid State Products Engineering Council and the JEIDA Japan Electronics Industry Development Association. The memory chips may, for example, be one megabyte by four chips with eight chips per card, or greater densities as such chips become available.

Prior to the present invention, it has been usual for error detection technologies to be supported by placement of the necessary bits immediately adjacent to data bits. Thus if an eight bit word was to have a single parity bit, then a thirty two bit wide transfer capability would require a thirty six bit storage capability. A thirty two bit wide transfer capability using ECC would require up to three additional bits (for a total of thirty nine with forty commonly being used), normally placed adjacent the data bits and disrupting normal memory element allocation which assumes parity error detection technology.

Figure 5:
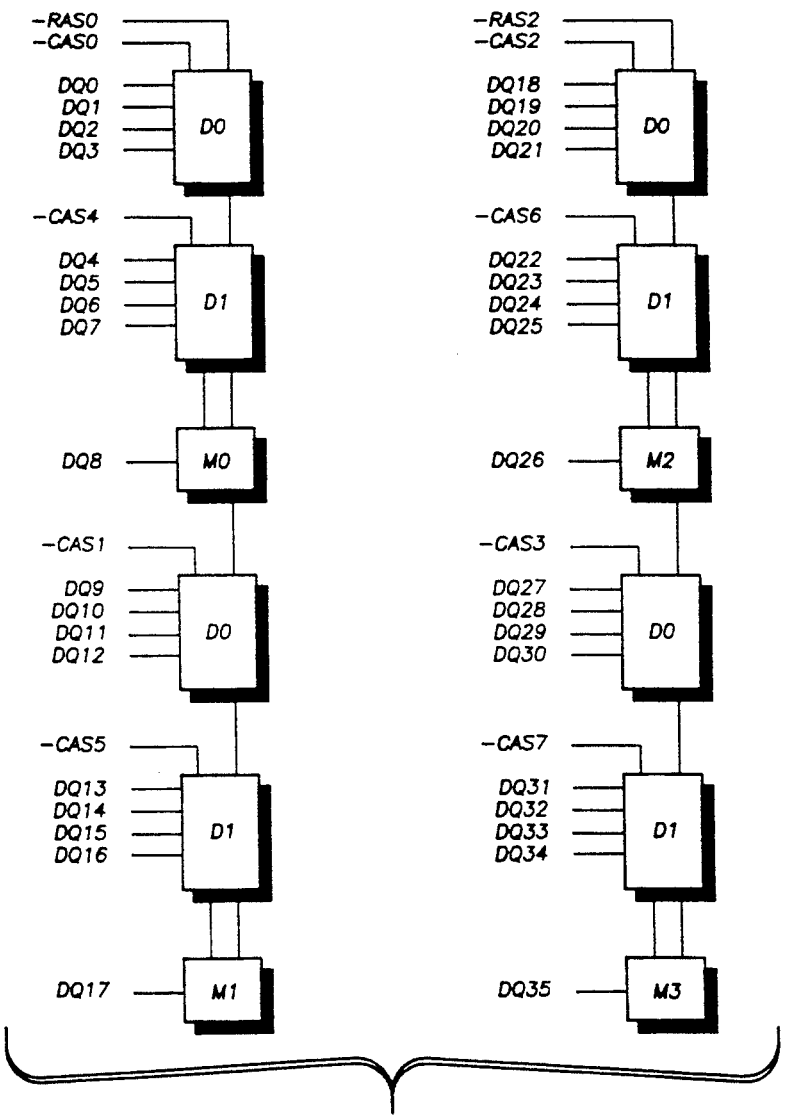
FIG. 5 is a schematic representation of one arrangement of DRAM within a card such as that of FIG. 4.

The present invention is distinguished by providing a DRAM card design (herein referred to as a memory element) in which a plurality of memory chips arranged in an array are each provided with accessibility for RAS and CAS, as shown in FIG. 5. In that figure, the accessibility of RAS0 and RAS2 and of CAS0 through CAS7 will be noted. Lines for such signals are, in accordance with this invention, brought out through the connector provided for receiving such a DRAM card. Prior art DRAM cards (not shown) used with parity error detection technology typically have certain of the CAS lines indicated in FIG. 5 tied together internally, namely CAS0 and CAS4, CAS1 and CAS5, CAS2 and CAS6, and CAS3 and CAS7.

Figure 6:
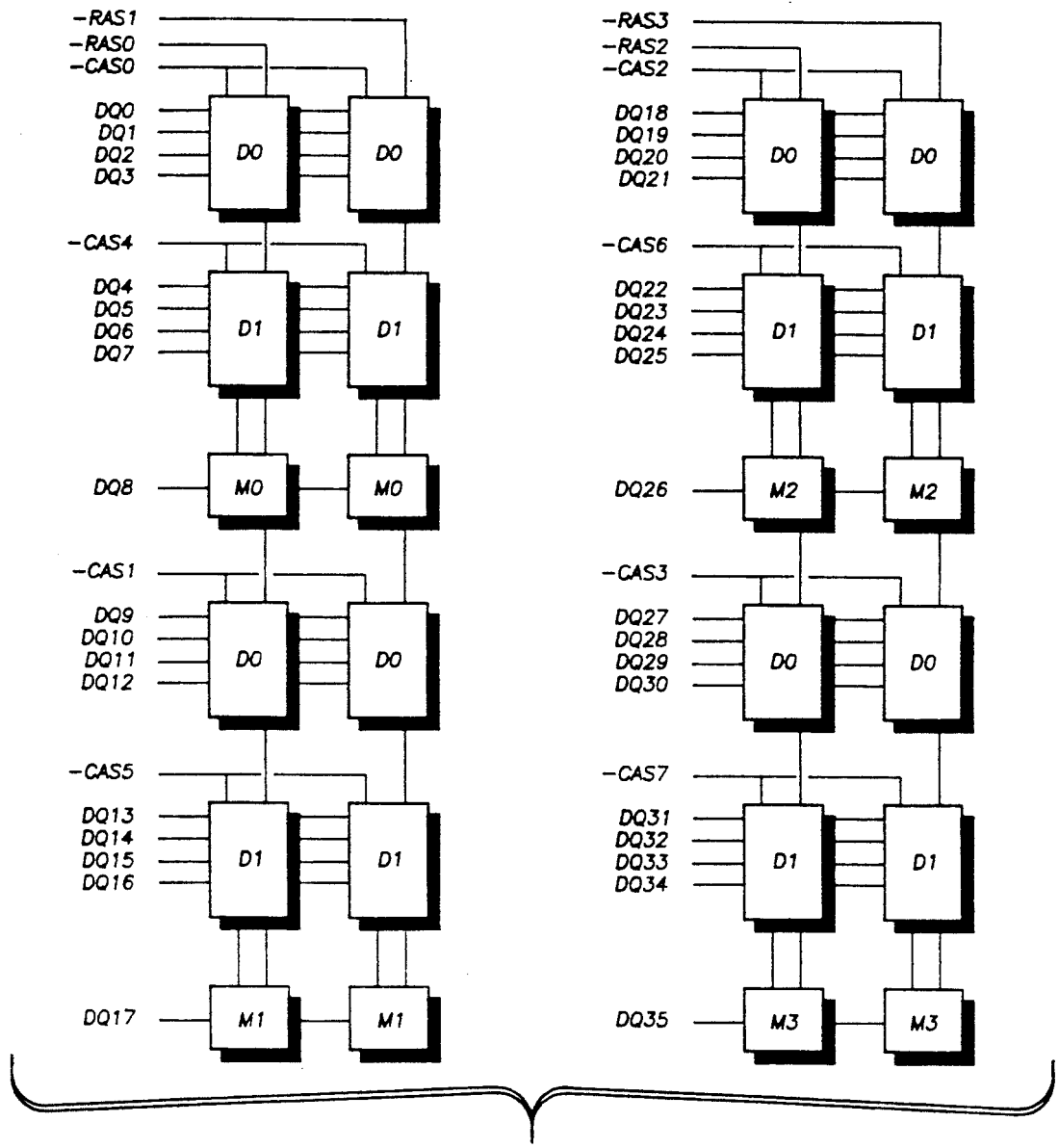
FIG. 6 is a schematic representation of a second arrangement of DRAM within a card such as that of FIG. 4.

The present invention also contemplates that DRAM cards may be designed with four banks of memory chips, and such a design is illustrated in FIG. 6. As with the card of FIG. 5, the card of FIG. 6 has a plurality of memory chips arranged in an array and each provided with accessibility for RAS and CAS. Note the accessibility of RAS0 through RAS3 and CAS0 through CAS7.

The DRAM cards of the present invention as illustrated in FIG. 5 and 6 have the capability of operating either as parity cards or as ECC cards, as will be brought out more fully hereinafter.

The present invention is also distinguished by providing that the personal computer system 10 accommodates operation in either parity or ECC manners. This characteristic will be addressed more fully hereinafter with reference to FIGS. 7 through 17, in which a number of examples of such operational capability are given. At this point in the description, it is sufficient to note that the BIC 35 provides the function, among others, of a memory controller capable of addressing physical memory locations within the DRAM 36. Further, the DRAM cards contemplated by this invention are received in a plurality of socket connectors provided on the planar board 20, each of which is indicated schematically in FIG. 7 through 17 at 61.

The present invention is further distinguished by the sharing of physical memory addresses between two DRAM cards in order to accommodate the writing, storage and reading of the additional bits needed to achieve ECC operation. That is, cards of the types illustrated in FIGS. 4 through 6 may be inserted into any one of the plurality of socket connectors provided and may function, at the election of a user configuring the system 10, as either parity or ECC memory. However, if a DRAM card inserted in a first position is to be used as an ECC memory, then certain of the ECC bits necessary for the intended function are written, stored and read from a physical location to be found on a second card. Further, the total number of ECC bits required are derived by using the parity bits otherwise normally stored on the first card with bits stored in what would normally be data bit physical addresses in the second card.

By way of illustration of these principles, if such a combination of cards is used to provide ECC operation in an eight bit wide data transfer, then data bits at D0 through D3 on the second card, accessed by RAS0 and CAS0, are used with the parity bit at M0 on the first card to provide five ECC bits. Similarly, data bits at D4 through D7, accessed by RAS0 and CAS4, are used with a parity bit at M1. Data bits at D9 through D12, accessed by RAS0 and CASI, are used with a parity bit at M2. Data bits at D13 through D17, accessed by RAS0 and CAS5, are used with a parity bit at M3. When such a combination of cards is used to provide ECC operation in a sixteen bit wide data transfer, then data bits at D0 through D3 on the second card, accessed by RAS0 and CAS0, are used with parity bits at M0 and M1 on the first card to provide six ECC bits. Similarly, data bits at D4 through D7, accessed by RAS0 and CAS4, are used with parity bits at M2 and M3. Data bits at D9 through D12, accessed by RAS0 and CASI, are used with parity bits at M0 and M1. Data bits at D13 through D17, accessed by RAS0 and CAS5, are used with parity bits at M2 and M3. When such a combination of cards is used to provide ECC operation in a thirty two bit wide data transfer, then data bits at D0 through D3 on the second card, accessed by RAS0 and CAS0, are used with parity bits at M0 through M2 on the first card to provide seven ECC bits. Similarly, data bits at D4 through D7, accessed by RAS0 and CAS4, are used with parity bits at M0 through M2. Data bits at D9 through D12, accessed by RAS0 and CASI, are used with parity bits at M0 through M2. Data bits at D13 through D17, accessed by RAS0 and CAS5, are used with parity bits at M0 through M2. As will be understood, M0 through M3 are the parity bits existing on a DRAM card which might otherwise be intended for parity operation, one per byte available on the card. D0 through D17 are sixteen (D8 being unused) of the thirty two available data bits in such a card. Each four bits in the ECC function card (called the second card in the discussion above), combined with parity bits available in the parity card (called the first card in the discussion above), forms the ECC code needed for the eight, sixteen and thirty two bit (one byte, two byte and four byte) wide transfers. This analysis does not discuss additional available bits D18 through D35, which are also used in a similar manner for ECC generation for additional memory.

It is to be noted that, if CAS0 and CAS4, CASI and CAS5, CAS2 and CAS6, and CAS3 and CAS7 are connected externally of the memory element 60, then the memory element will operate as a DRAM card with parity error detection. This is one of the ways in which a single memory element can be employed in both parity and ECC operations. With the card design of FIG. 5, some data bits are connected externally and individual CAS control allows four bit operation. Such four bit control, coupled with the parity bits as described above, provides the five to seven ECC bits needed for one, two or four byte data width single bit correction and double bit detection.

The design of FIG. 6 functions similarly to that of FIG. 5 while allowing greater capability.

The knowledgeable reader will appreciate that there is a relationship between the memory capability of a memory element 60 in accordance with this invention and the total amount of memory locations which can be supported in ECC operation. The following tables will illustrate such relationship.

| | Four Megabyte Memory Element | | | | | |
|---|---|---|---|---|---|---|
| ECC Bit | SBC | DBD | Data Width | Memory Maximum | RMW 8 bit | RMW 16 bit |
| 4 | Yes | No | 8 | 8MB | No | No |
| 5 | Yes | Yes | 8 | 8MB | No | No |
| 5 | Yes | No | 16 | 16MB | Yes | No |
| 6 | Yes | Yes | 16 | 16MB | Yes | No |
| 6 | Yes | No | 32 | 32MB | Yes | Yes |
| 7 | Yes | Yes | 32 | 32MB | Yes | Yes |

| | Eight Megabyte Memory Element | | | | | |
|---|---|---|---|---|---|---|
| ECC Bit | SBC | DBD | Data Width | Memory Maximum | RMW 8 bit | RMW 16 bit |
| 4 | Yes | No | 8 | 16MB | No | No |
| 5 | Yes | Yes | 8 | 16MB | No | No |
| 5 | Yes | No | 16 | 32MB | Yes | No |
| 6 | Yes | Yes | 16 | 32MB | Yes | No |
| 6 | Yes | No | 32 | 64MB | Yes | Yes |
| 7 | Yes | Yes | 32 | 64MB | Yes | Yes | third columns identify whether Single Bit Correction (SBC) and Double Bit Detection (DBD) are performed. The Maximum Memory column identifies the maximum number of physical memory address which can be handled, and the RMW (for read/modify/write) columns indicate whether or not such operations will be required for eight and sixteen bit writes.

For a given number of ECC bits, there is a corresponding maximum amount of memory which can be supported by a memory element in accordance with this invention when used as an ECC card (that is, a DRAM card in which ECC bits alone are written, stored and from which such bits are read). There is also a choice of data width that a user may choose, with sufficient flexibility to accommodate least cost and best performance requirements. For example, from the Four Megabyte table, such a memory element may be used in an ECC system to support up to thirty two megabytes of memory, with read/modify/write (RMW in the table) operations on eight and sixteen bit writes. The same card can be setup to support eight megabytes of memory with no penalty of RMW on eight and sixteen bits writes. There is also a choice of six ECC bits which is midway of the others. The Eight Megabyte table illustrates similar availabilities.

Applications of the present invention are schematically illustrated in FIGS. 7 through 17. Each of these figures shows a simplified schematic of a portion of the computer system 10 as illustrated in FIG. 3, namely the BIC 35 and the socket connectors in which DRAM cards 60 may be received. In the Figures, some socket connectors are sometimes shown as Empty, in order that a full range of performance variations may be indicated. In FIGS. 7 through 12, one socket connector is served by RAS0 through RAS3 lines from the memory controller function of the BIC 35, and functions as the connection point for a DRAM card used as what is here referred to as an ECC card. The function of the card inserted into that socket is to receive the additional ECC bits which, when combined with parity bits received by cards inserted into other sockets, will provide the ECC function described above. The ECC card, and the socket into which such a card would be inserted, is used only for the ECC function described and not for other data.

Figure 7:
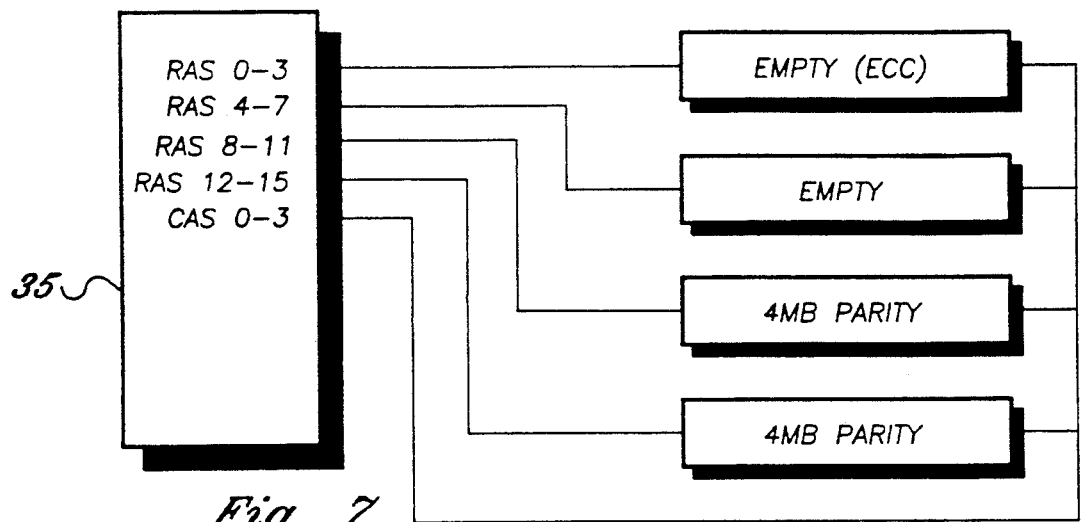

In the example of FIG. 7, the machine has been configured with eight megabytes of memory by the insertion of two four megabyte memory elements (as in FIG. 5) into two sockets. With an ECC card absent, the memory functions with parity detection only.

Figure 8:
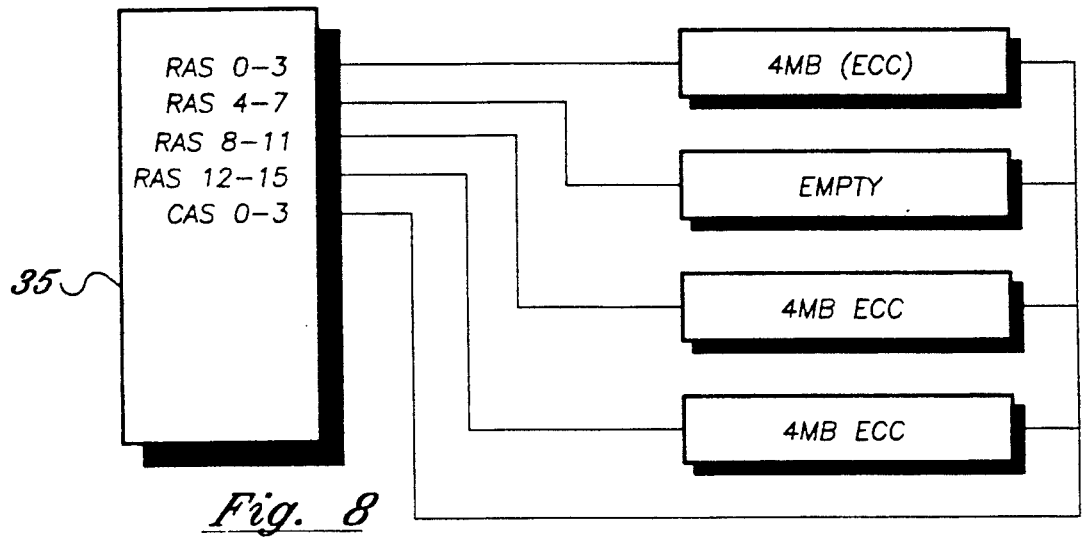

In FIG. 8, a four megabyte memory element has been inserted into the ECC socket, enabling the use of eight megabytes of memory with five bit ECC.

Figure 9:
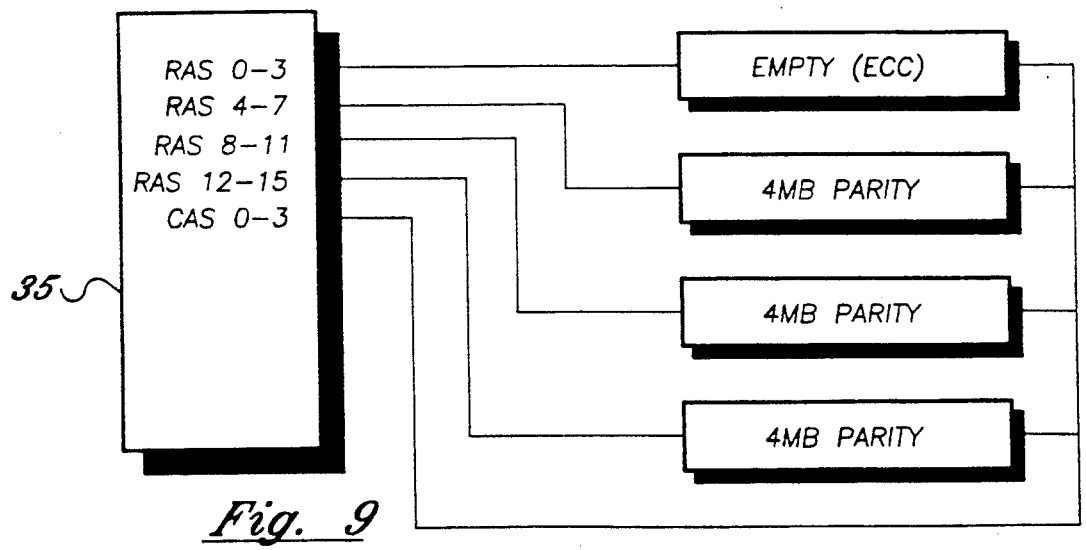

In FIG. 9, the user of the system of FIG. 8 has presumably decided that current needs are for twelve megabytes of memory, and that parity detection is sufficient. Thus the user may remove the memory element from the ECC socket and relocate it to another socket for use as parity memory.

FIG. 10 illustrates the manner in which the user of the system of FIG. 9 could return to ECC operation, obtaining the best performance for the twelve megabytes of installed memory by using an eight megabyte memory element (as in FIG. 6) in the ECC socket. In FIG. 10, all sockets in the illustrated set are filled, opening the possibility of relocating the memory elements used as memory requirements may vary.

FIG. 11 illustrates such a change, where the eight megabyte memory element has been switched with one of the four megabyte memory elements, to give sixteen megabytes of active memory used with six bit ECC. FIG. 12 illustrates the next step, in which active memory is again at sixteen megabytes, while higher performance ECC is attained by using an eight megabyte ECC Card.

The arrangements of FIG. 13 through 17 differ from those found in FIGS. 7 through 12 in that lines for CAS4 through CAS7 have been added for what has been identified as the ECC socket in the earlier figures. This allows the DRAM card inserted into that socket to be used as parity memory in addition to being used as ECC memory as described herein. FIGS. 13 and 14 generally parallel FIGS. 7 and 8 as described above. However, FIG. 15 illustrates the use of a simple software command to reuse what had been (in FIG. 14) the ECC card as a parity memory card, thereby increasing the memory to twelve megabytes. FIG. 16 parallels FIG. 11 described above, while FIG. 17 parallels FIG. 12.

As will be understood from a careful consideration of the description above, the present invention contemplates a particular organization of a memory element (in which particular access is possible to the memory chips in an array); of a personal computer system (in which a memory controller function accesses memory elements in a particular way to distribute ECC data between two physical memory elements); and of a method of operating a personal computer system (in which physical memory elements may be readily moved from location to location while varying the error detection technology employed). In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:
   a microprocessor;
   a plurality of socket connectors, each for receiving a volatile memory element, one of said socket connectors being a software selectable parity/ECC connector addressable for connecting with memory elements having devices addressable for handling data bits in any selected one of a first predetermined word length and multiples of two, four and eight times the predetermined word length and the remainder of said socket connectors being parity connectors addressable for connecting with memory elements having devices addressable for handling data bits in any selected one of multiples of two, four and eight times the predetermined word length;
   a plurality of volatile memory elements, each mounted in a corresponding one of said plurality of socket connectors and having:
   a substrate;
   a plurality of dynamic random access memory devices mounted in an array on said substrate, said devices being arranged in banks and pages for receiving data bits written to and stored in and read from said devices;
   a plurality of signal conducting pathways on said substrate connecting to said devices for conducting data bits being transferred thereto and therefrom;
   a connector coupled to said pathways for coupling said devices to a personal computer system; and
   a protective enclosure encompassing said substrate and said devices and said connector;
   one of said volatile memory elements being a parity/ECC memory element mounted in said one parity/ECC connector and having said pathways and said devices thereof together providing for access of column address signals to each of said devices and of row address signals to each of said banks of said devices, whereby data bits written to and stored in and read from said devices may be handled in any selected one of the first predetermined word length and multiples of two, four and eight times the predetermined word length;
   the remainder of said volatile memory elements each being a parity memory element mounted in a corresponding one of said parity connector remainder of said socket connectors and having said pathways and said devices together providing for access of column address signals to pairs of said devices and of row address signals to each of said banks of said devices, whereby data bits written to and stored in and read from said devices may be handled in any selected one of multiples of two, four and eight times the predetermined word length; and
   a bus interface controller coupled to said socket connectors for issuing row and column address signals determining the physical location in available volatile memory elements of data written thereto and stored therein and read therefrom;

said bus interface controller selectively enabling the direction to said parity/ECC connector and said parity/ECC memory element of data bit words representing error correcting code and the direction to one of said parity socket connectors and the parity memory element mounted therein data bit words representing data associated with error correcting code directed to said parity/ECC socket connector.

2. A personal computer system comprising:
a microprocessor;
a plurality of socket connectors, each for receiving a volatile memory elements, one of said socket connectors being an ECC connector configured for connecting with memory elements having devices addressable for handling data bits in a first predetermined word length and the remainder of said socket connectors being parity connections configured for connecting with memory elements having devices addressable for handling data bits in any selected one of multiples of two, four and eight times the predetermined word length;
a plurality of volatile memory elements, each mounted in a corresponding one of said plurality of socket connectors and having:
a substrate;
a plurality of dynamic random access memory devices mounted in an array on said substrate, said devices being arranged in banks and pages for receiving data bits written to and stored in and read from said devices;
a plurality of signal conducing pathways on said substrate connecting to said devices for conducting data bits being transferred thereto and therefrom;
a connector coupled to said pathways for coupling said devices to a personal computer system; and
a protective enclosure encompassing said substrate and said devices and said connector;
one of said volatile memory elements being an ECC memory element mounted in said ECC connector and having said pathways and said devices together providing for access of column address signals to each of said devices and of row address signals to each of said banks of said devices, whereby data bits written to and stored in and read from said devices may be handled in the first predetermined word length;
the remainder of said volatile memory elements each being parity memory elements mounted in a corresponding one of said parity connectors and having said pathways and said devices together providing for access of column address signals to pairs of said devices and of row address signals to each of said banks of said devices, whereby data bits written to and stored in and read from said devices may be handled in any selected one of multiples of two, four and eight times the predetermined word length; and
a bus interface controller coupled directly to said socket connectors for issuing row and column address signals determining the physical location in available volatile memory elements of data written thereto and stored therein and read therefrom;
said bus interface controller directing to said ECC connector and said ECC memory elements mounted therein data bit words representing error correcting code and directing to one of said parity connectors and the parity memory element mounted therein data bit words representing data associated with error correcting code directed to said ECC connector.

3. A method of operating a personal computer permitting a selection between parity and error correction code error detection, the method comprising the steps of:
providing parity memory elements for receiving, storing and permitting reading of parity data comprising data bits and associated parity bits;
providing ECC memory elements for receiving, storing and permitting reading of error correcting code associated with parity data and comprising error correction bits;
selecting between parity error detection and error correction code error detection; and
in the event parity error detection is selected, writing and reading data only to and from parity memory elements;
in the event error correction code error detection is selected, coordinating the writing and reading of data to and from parity memory elements and the writing and reading of associated error correcting code to and from ECC memory elements.

4. A method of operating a personal computer using error correction code error detection, the method comprising the steps of:
providing parity memory elements for receiving, storing and permitting reading of parity data comprising data bits and associated parity bits;
providing ECC memory elements for receiving, storing and permitting reading of error correcting code associated with parity data and comprising error correction bits;
coordinating the writing and reading of data to and from parity memory elements and the writing and reading of associated error correcting code to and from ECC memory elements.

5. A method according to claim 4 wherein parity associated with parity data written to and stored in and read from parity memory elements are combined with associated error correction code bits written to and stored in and read from ECC memory elements for supplying an error correction code block to be used in performing error detection.

6. A personal computer system comprising:
a data bus;
a microprocessor coupled directly to said data bus;
a plurality of socket connectors, each for receiving a volatile memory element and being coupled directly to said data bus; one of said socket connectors being addressable for handling data bits in any selected one of a first predetermined word length and multiples of two, four and eight times the predetermined word length and the remainder of said socket connectors being addressable for handling data bits in any selected one of multiples of two, four and eight times the predetermined word length;
a bus interface controller coupled directly to said data bus for providing communications between said data bus and an input/output bus and for issuing to said connectors row and column address signals determining the physical location in available volatile memory elements received in said connectors of data written thereto and stored therein and read therefrom and thereby selecting between parity error detection and error correction code error detection for data written to and stored in and read from available volatile memory elements; said bus interface controller;
- (1) in the even parity error detection is selected, selecting all available memory elements for use as parity memory elements and writing and reading data to and from the selected memory elements as parity error detection data; and
- (2) in the event error correction code error detection is selected, selecting memory elements received in said remainder of said sockets as parity memory elements and any memory element received in said one socket as an error correction code memory element and coordinating the writing and reading of data to and from parity memory elements and the writing and reading of associated error correcting code to and from the error correcting code memory element.

7. A personal computer system comprising:

a microprocessor;

a plurality of socket connectors, each for receiving a volatile memory element, one of said socket connectors being addressable for handling data bits in any selected one of a first predetermined word length and multiples of two, four and eight times the predetermined word length and the remainder of said socket connectors being addressable for handling data bits in any selected one of multiples of two, four and eight times the predetermined word length;

a plurality of volatile memory elements, each mounted in a corresponding one of said plurality of socket connectors and having:

a substrate;

a plurality of dynamic random access memory devices mounted in an array on said substrate, said devices being arranged in banks and pages for receiving data bits written to and stored in and read from said devices;

a plurality of signal conducting pathways on said substrate connecting to said devices for transferring data bits thereto and therefrom;

a connector coupled to said pathways for coupling said devices to a personal computer system; and a protective enclosure encompassing said substrate and said devices and said connector;

one of said volatile memory elements being mounted in said one socket connector and having said pathways and said devices together providing for access of column address signals to each of said devices and of row address signals to each of said banks of said devices, whereby data bits written to and stored in and read from said devices may be handled in any selected on of the first predetermined word length and multiples of two, four and eight times the predetermined word length;

the remainder of said volatile memory elements each being mounted in a corresponding one of said remainder of said socket connectors and having said pathways and said devices together providing for access of column address signals to pairs of said devices and of row address signals to each of said banks of said devices, whereby data bits written to and stored in and read from said devices may be handled in any selected one of multiples of two, four and eight times the predetermined word length; and a bus interface controller coupled to said socket connectors for issuing row and column address signals determining the physical location in available volatile memory elements of data written thereto and stored therein and read therefrom and thereby selecting between parity error detection and error correction code error detection for data written to and stored in and read from available volatile memory elements; said bus interface controller;
- (1) in the event parity error detection is selected, selecting all available memory elements for use as parity memory elements and writing and reading data to and from the selected memory elements as parity error detection data; and
- (2) in the event error correction code error detection is selected, selecting said remainder of said memory elements as parity memory elements and said one memory element as an error correction code memory element and coordinating the writing and reading of data to and from parity memory elements and the writing and reading of associated error correcting code to and from the error correcting code memory element.

8. A method of operating a personal computer permitting a selection between parity and error correction code error detection, the method comprising the steps of:
- (1) providing memory elements capable of selective use:
  - (a) as parity memory elements for receiving, storing and permitting reading of parity data comprising data bits and associated parity bits; and
  - (b) as ECC memory elements for receiving, storing and permitting reading of error correcting code associated with parity data and comprising error correction bits;
- (2) selecting between parity error detection and error correction code error detection;
- (3) in the event parity error detection is selected, selecting all available memory elements for use as parity memory elements and writing and reading data to and from the selected memory elements as parity error detection data; and
- (4) in the event error correction code error detection is selected, selecting certain memory elements as parity memory elements and the remainder as error correction code memory elements and coordinating the writing and reading of data to and from parity memory elements and the writing and reading of associated error correcting code to and from ECC memory elements.

* * * * *